United States Patent

[11] 3,579,746

| [72] | Inventor | James Marik |
| | | Tallmadge, Ohio |
| [21] | Appl. No. | 801,111 |
| [22] | Filed | Feb. 20, 1969 |
| [45] | Patented | May 25, 1971 |
| [73] | Assignee | Marik Spring Inc. |
| | | Summit, Ohio |

[54] TIE-DOWN CLIP
3 Claims, 4 Drawing Figs.

[52] U.S. Cl. .................................................... 24/131,
24/73, 248/361, 24/230.5
[51] Int. Cl. ...................................................... F16g 11/14,
F16g 45/00
[50] Field of Search ........................................... 24/129 (C),
131, 73 (A), 265 (H), 73 (C), 73.12, 73.90, 230.5
(CW), (RS), (CR), 84 (A), 86 (A), 237
(Cursory), 131 (Cursory), 119.1; 43/44.83, 48.77;
292/288; 248/361 (A), 339, 340, 307, 328, 341;
294/82 (Cursory), 78 (Cursory)

[56] References Cited
UNITED STATES PATENTS

| 496,696 | 5/1893 | Nash | 24/73-AUX |
| 895,493 | 8/1908 | O'Brien | 43/44.83 |
| 1,519,854 | 12/1924 | Lockwood | 24/73-AUX |
| 1,915,876 | 6/1933 | Wallace | 43/44.83 |
| 2,320,067 | 5/1943 | Caughren | 24/73.12 UX |
| 2,841,349 | 7/1958 | Charles | 24/73X |

FOREIGN PATENTS

| 517,114 | 9/1931 | Germany | 43/44.83 |

*Primary Examiner*—Bernard A. Gelak
*Attorney*—Oldham & Oldham

ABSTRACT: A tiedown clip comprising a substantially J-shaped metal member having a closed loop at its upper end is provided and is adapted to receive a pair of sections of a resilient rope in the closed loop of the metal member to secure the rope rapidly and snugly to the metal member, which metal member is normally formed from a metal wire and has all portions thereof lying in a common plane.

PATENTED MAY 25 1971 3,579,746

INVENTOR.
JAMES MARIK
BY
Oldham & Oldham
ATTORNEYS.

TIE-DOWN CLIP

The present invention relates to tiedown clips, and to combinations of resilient ropes with such clip to provide a convenient means for securing a rope to a retaining or anchor means.

Heretofore there have been various types of metal clips provided for attaching ropes or similar members to attaching or anchoring means. Some of such prior art units are shown in U.S. Pat. Nos. 695,699; 3,142,264 and 3,328,064. However, all of such previous clips of which I am aware have either been relatively costly to produce, or have been rather bulky to package, store and ship, or have been objectionable for other reasons. These tiedown clips are used in relatively large numbers and obviously the cost of the clips, together with the convenience of use of the clips, are major problems involved in whether or not any proposed clip is a commercially satisfactory product.

The general object of the present invention is to provide a novel and improved tiedown clip and a novel combination between a resilient rope and the tiedown clip whereby rope can be conveniently but securely tied to an anchoring means and will remain in engagement with the clip even if the rope is wet.

Another object of the invention is to provide a metal clip made from one piece of wire by a few relatively simple forming actions and wherein one end of the clip has a substantially closed loop provided for rope-receiving and securing purposes.

Another object of the invention is to provide a substantially J-shaped wire clip adapted for use in rope securing actions and wherein the clip is a quite compact, flat member adapted to be stored in a small space and to be inexpensively produced, packaged and used.

The foregoing and other objects and advantages of the invention will be made more apparent as the specification proceeds.

When referring to corresponding members shown in the drawings and referred to in the specification, corresponding numerals are used to facilitate comparison between such equivalent members.

Generally speaking, the present invention, as one embodiment thereof, relates to a tiedown clip comprising a substantially J-shaped metal member usually made from a unitary piece of wire, and having a closed loop at its upper end for receiving a plurality of sections of a rope thereon. Such loop is on the inside of the metal member and is of substantially rectangular shape.

Figure 1:
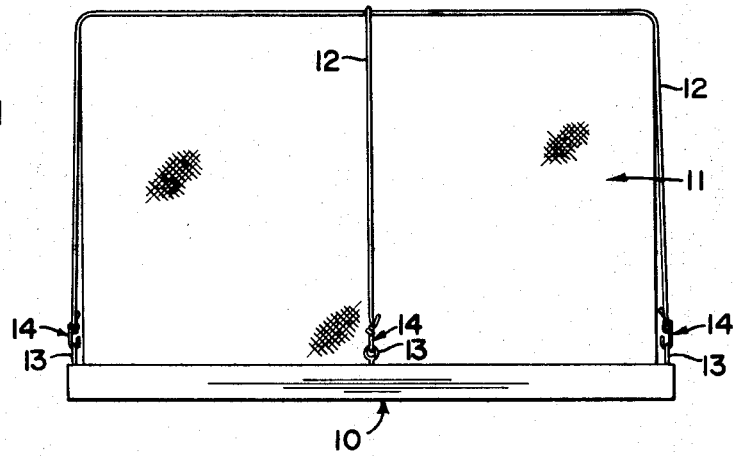
FIG. 1 is an elevation of a frame with tiedown means of the invention securing ropes over an article on the frame.

Attention now is particularly directed to the details of the structure shown in the drawings, and a typical frame is indicated at 10 over which some suitable cover means 11 is to be secured. In this instance, the cover means 11 is shown secured over the frame and any load or member carried thereby by a plurality of ropes 12. These ropes 12 are secured to members such as eyes 13 that are attached to the frame 10 by the novel tiedown clips indicated as a whole by the numeral 14.

These tiedown clips 14 each comprise a substantially J-shaped metal member, normally made from a unitary piece of wire 15. This wire 15 has a substantially or almost completely closed, substantially rectangularly shaped loop 16 provided at its upper end. The loop 16 is formed, in association with an upright portion 17 of the wire 15 by a first laterally inwardly extending section 18, a second axially inwardly extending section 19, and a third laterally outwardly extending section 20. The end of the wire 15 which forms the laterally outwardly extending section 20 terminates immediately adjacent, and in some instances, actually abutting against the upright portion 17 of the J-shaped wire forming the clip 14.

The drawing clearly shows that the hook 21 of the J-shaped member is appreciably wider, usually at least about twice as wide as the loop 16 of the clip 14 and with such loop 16 only extending a portion of the length of the upright of the J-shaped member, such as about one-third of the length of such member whereby a relatively small loop 16 is provided for receiving and securing ends of the ropes 12 thereto whereas the J-shaped hook 21 is readily adapted to be engaged with the eye 13 to attach an end of the rope 12 to the frame 10. Hence any desired anchor or securing ropes for retaining a cover or a load or other members on the frame 10 in a given position, can be attached to the frame. Naturally, the tiedown clip 14 and rope 12 can be used in any desired assembly for attaching any members or a cover to a load carrying unit or other attachment device.

Figure 2:
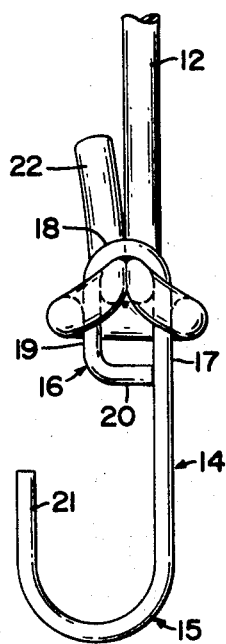
FIG. 2 is an enlarged elevation of a tiedown clip and rope assembly.
Figure 3:
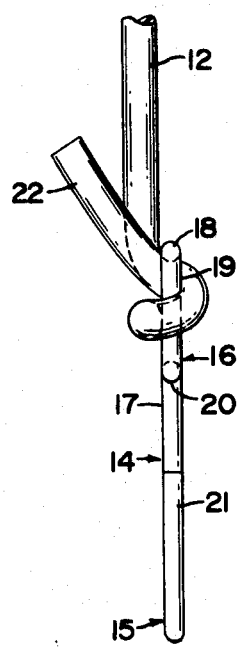
FIG. 3 is a left side elevation of the assembly of FIG. 2.
Figure 4:
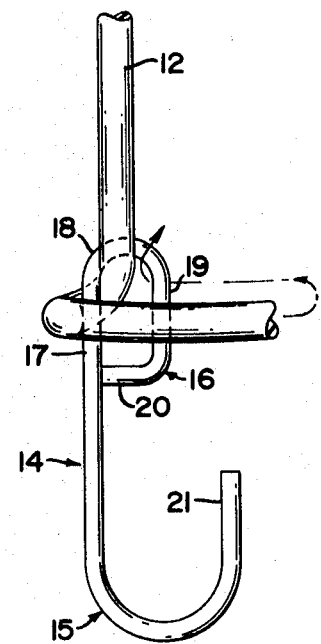
FIG. 4 is an elevation of the clip showing the steps of securing a rope thereto.

It is a feature of the invention that the loop 16 is provided of substantially uniform width for the length thereof, and that such loop 16 at the interior dimension thereof, is less than twice the diameter of the rope 12 is when uncompressed. In other words, the size of the loop 16, and particularly the inner diameter thereof, is correlated with the normal diameter of the particular rope 12 that is to be attached thereto. Specifically, the rope 12 is particularly adapted to be engaged with the loop 16 by threading an end portion 22 of the rope 12 through the loop 16 from the upper end thereof and then twisting or bringing the rope end 22 out around the side section 17 of the loop across the loop and around the opposite side section 19 of the loop and then threading the rope end 22 back up through the loop 16. The first and succeeding steps in securing the rope 12 to the tiedown clip 14 are indicated in FIG. 4, and the ultimate tiedown combination produced is shown in FIG. 2. It will be noted that the rope end 22 can extend any desired distance from the loop 16 when attached thereto. However, in all instances, the two sections of the rope 12 received within the loop 16 are compressed against each other by the overall width of the loop 16, plus the continuous portion of the rope extending across the loop and being doubled back through the loop opening whereby a very sturdy, satisfactory but rapidly provided knot or attaching loop has been provided in the rope. The clip 14 is particularly adapted to receive and engage the loop and rope end for anchoring it and the rope 12 to an anchor means, such as the eye 13 provided on the frame.

The drawings clearly show that the tiedown clip 14 is made from a unitary piece of wire and that all of the components of this tiedown clip lie in a common plane whereby the clip is compact and can be stored and shipped in compact form. Likewise, the clip can be made relatively inexpensively by a few relatively uncomplicated forming operations, but yet a very sturdy, satisfactory clip has been provided particularly adapted for combination with a doubled thickness of a rope, as shown in the drawings. It particularly is important in practice of the invention that the ropes 12 be made from a resilient, flexible material, such as some type of an elastomer composition including, but not limited to natural rubbers, synthetic rubbers, rubberlike materials, etc. whereby the two strands of the rope received within the opening of the loop 16 are in compressed relationship to each other.

Such compression action on the rope sections is aided by the formation of the top section 18 of the loop of substantially arcuate shape.

From the foregoing, it is believed that the objects of the present invention have been achieved.

While one complete embodiment of the invention has been disclosed herein, it will be appreciated that modification of this particular embodiment of the invention may be resorted to without departing from the scope of the invention as defined in the appended claims.

I claim:

1. In combination, a resilient rope and a J-shaped metal wire having a closed loop at its upper end, on the inside of and coplanar with said J-shaped metal wire for receiving a plurality of sections of said rope therein, said closed loop being about one-half as wide as a hook portion formed at the lower end of the wire and having a width substantially twice the diameter of said rope, said loop having an arcuate terminal end with the remaining portion being of generally rectangular shape, the hook portion forming a connector means, said rope being looped around the outside of said loop at its upper end and having two sections threaded through said metal wire loop and being compressed against each other by said metal loop to aid in securing said rope to said metal wire which can be attached to a member by the connector means.

2. The combination as in claim 1 where said rope is formed from a flexible elastomer material.

3. A tiedown clip as in claim 1 where said metal member comprises a length of metal wire having one end bent around to form said closed loop by a first laterally inwardly extending section, a second axially inwardly extending section, and a third laterally outwardly extending section, all of said sections lying in the common plane with said metal member and said third section terminating immediately adjacent a portion of the upright section of said J-shaped metal member.